US012625101B2

(12) United States Patent
Mazur et al.

(10) Patent No.: US 12,625,101 B2
(45) Date of Patent: May 12, 2026

(54) METHOD FOR IDENTIFYING A STATE OF A STREAM OF REFRIGERANT

(71) Applicant: Carrier Corporation, Palm Beach Gardens, FL (US)

(72) Inventors: Mateusz Mazur, Sopot (PL); Leszek Wolski, Reda (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 353 days.

(21) Appl. No.: 18/541,937

(22) Filed: Dec. 15, 2023

(65) Prior Publication Data
US 2024/0219331 A1 Jul. 4, 2024

Related U.S. Application Data

(60) Provisional application No. 63/477,628, filed on Dec. 29, 2022.

(51) Int. Cl.
*G01N 25/64* (2006.01)
*F24F 11/30* (2018.01)
(Continued)

(52) U.S. Cl.
CPC .............. *G01N 25/64* (2013.01); *F24F 11/30* (2018.01); *F24F 11/52* (2018.01); *F25B 41/40* (2021.01);
(Continued)

(58) Field of Classification Search
CPC ...... G01N 25/64; G01N 21/81; G01N 31/222; F24F 11/30; F24F 11/52; F25B 41/40;
(Continued)

(56) References Cited

U.S. PATENT DOCUMENTS 3,100,691 A * 8/1963 Jones ................... G01N 31/222
422/402
5,187,363 A 2/1993 Birkle
(Continued)

FOREIGN PATENT DOCUMENTS

CN 100338401 C 9/2007
CN 201251550 Y 6/2009
(Continued)

OTHER PUBLICATIONS

CN-115841478-A, English Translation (Year: 2023).*
(Continued)

*Primary Examiner* — Ryan D Walsh
(74) *Attorney, Agent, or Firm* — Drew Folgmann

(57) ABSTRACT

A method for identifying a state of a stream of refrigerant includes capturing a plurality of sample images of a sensor for sensing the stream of the refrigerant, processing each of the plurality of sample images to identify a first color indicative of a dry refrigerant and a second color indicative of a wet refrigerant. The method also includes calculating an aggregated volume of each of the first color and the second color, wherein the aggregated volumes of the first color and the second color indicate a dry refrigerant or the wet refrigerant respectively in the stream. Further, the method includes comparing an aggregated volume ratio of the first color and the second color with a first threshold ratio and a second threshold ratio and determining the state as one of a dry state, a transient state, and a wet state based on the comparison.

19 Claims, 4 Drawing Sheets

(51) Int. Cl.

| | |
|---|---|
| *F24F 11/52* | (2018.01) |
| *F25B 41/40* | (2021.01) |
| *F25B 49/00* | (2006.01) |
| *F25B 49/02* | (2006.01) |
| *G01N 21/81* | (2006.01) |
| *G01N 31/22* | (2006.01) |

(52) U.S. Cl.
CPC .............. *F25B 49/00* (2013.01); *F25B 49/02* (2013.01); *G01N 21/81* (2013.01); *G01N 31/222* (2013.01); *F25B 2500/14* (2013.01); *F25B 2700/02* (2013.01)

(58) Field of Classification Search
CPC ...... F25B 49/00; F25B 49/02; F25B 2500/14; F25B 2700/02
See application file for complete search history.

(56) References Cited

U.S. PATENT DOCUMENTS

| | | | |
|---|---|---|---|
| 5,341,649 A | 8/1994 | Nevitt et al. |
| 6,576,473 B1 | 6/2003 | Scaringe et al. |
| 10,347,114 B2 | 7/2019 | Johnson et al. |
| 11,398,055 B2 | 7/2022 | Suwa et al. |

| | | | | |
|---|---|---|---|---|
| 2017/0350823 A1* | 12/2017 | Kelly | .................. | G01N 21/783 |
| 2018/0328853 A1 | 11/2018 | Ma | | |
| 2018/0357884 A1 | 12/2018 | Johnson et al. | | |
| 2023/0073702 A1* | 3/2023 | Xiong | ................... | H04N 23/80 |

FOREIGN PATENT DOCUMENTS

| | | | | |
|---|---|---|---|---|
| CN | 106198533 | B | | 1/2019 |
| CN | 110657609 | A | | 1/2020 |
| CN | 114085399 | A | | 2/2022 |
| CN | 216117350 | U | | 3/2022 |
| CN | 114373875 | A | | 4/2022 |
| CN | 115841478 | A | * | 3/2023 |
| DE | 20202939 | U1 | | 8/2002 |
| EP | 2620766 | B1 | | 11/2016 |
| EP | 3374701 | B1 | | 9/2020 |
| JP | H0719611 | A | * | 1/1995 |
| JP | 2012247257 | A | | 12/2012 |
| WO | 9323739 | A1 | | 11/1993 |
| WO | 2020180011 | A1 | | 9/2020 |

OTHER PUBLICATIONS

JP-H0719611-A, English Translation (Year: 1995).*
Extended European Search Report received for EP Application No. 23218717.9, mailed on May 29, 2024, 5 Pages.

* cited by examiner

METHOD FOR IDENTIFYING A STATE OF A STREAM OF REFRIGERANT

CROSS REFERENCE TO RELATED APPLICATIONS

This application claims the benefit of U.S. Provisional Patent Application No. 63/477,628 filed on Dec. 29, 2022 which is incorporated herein in its entirety.

FIELD OF THE INVENTION

The disclosure relates to aspects of identifying a state of a stream of refrigerant.

BACKGROUND

A refrigeration system includes various pipes and hoses that supply refrigerant to different components of the refrigeration system, such as a compressor, a condenser, an expansion valve, or an evaporator. Some of the hoses may include a sight glass having a moisture sensor adapted to sense the wet refrigerant in a stream of refrigerant flowing through the hose. Generally, the moisture sensor changes color in the presence of the wet refrigerant or dry refrigerant.

The moisture sensor, though able to sense the presence of wet refrigerant, is not capable of determining the volume of wet refrigerant inside the stream. Such information may be needed to plan service or repair or change operating parameters to remove the wet refrigerant from the stream and improve the performance of the refrigeration system.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

The disclosure relates to a technique for determining a state of a stream of refrigerant. The technique involves gathering and processing image samples for short time intervals and aggregating the processed information to determine whether the stream is wet, dry, or in a transient state.

Disclosed herein is a method for identifying a state of a stream of refrigerant. The method includes capturing, by an image sensor in a set of short-predefined intervals, a plurality of sample images of a sensor for sensing the stream of the refrigerant, wherein the sensor changes its color in response to one of presence or absence of humidity associated with the refrigerant in the stream, wherein a dry refrigerant is one associated with the absence of humidity and a wet refrigerant is one associated with the presence of humidity; processing each of the plurality of sample images to identify a plurality of colors, wherein a first color among the plurality of colors is indicative of a dry refrigerant and a second color among the plurality of colors is indicative of a wet refrigerant; calculating, for a long-predefined interval, an aggregated volume of each of the first color and the second color corresponding to the plurality of processed sample images, wherein the aggregated volumes of the first color and the second color are indicative of a volume of the dry refrigerant and the wet refrigerant respectively in the stream; comparing an aggregated volume ratio of the first color and the second color with a first threshold ratio and a second threshold ratio;

and determining the state as one of a dry state, a transient state, and a wet state based on the comparison.

In some embodiments, the aggregated volume ratio corresponds to a ratio of the volume of the first color and the second color.

In some embodiments, the method includes identifying a third color from the plurality of color corresponding to an abnormal image sensor operation due to lack of illumination. The method further includes calculating, for a long-predefined interval, an aggregated volume of third color corresponding to the plurality of processed sample images, wherein the aggregated amount of black color is indicative of a volume of the abnormal image sensor operation due to lack of illumination. The method also includes comparing the calculated aggregated volume of the third color with a third threshold ratio and determining the state as an abnormal state based on the comparison.

In some embodiments, the state of the stream is determined as the dry state if the ratio is greater than the first threshold ratio.

In some embodiments, the state of the stream is determined as the transient state if the ratio is less than the first threshold ratio and greater than the second threshold ratio.

In some embodiments, the state of the stream is determined as the wet state if the ratio is less than the second threshold ratio.

In some embodiments, the method includes sensing, by a temperature sensor, a temperature of the refrigerant; and setting a value of each of the first threshold ratio and the second threshold ratio based on the sensed temperature.

In some embodiments, an apparatus for sensing a state of a stream of refrigerant is disclosed. The apparatus includes a moisture sensor in fluid communication with the stream of refrigerant and is configured to change color in response to one of presence or absence of humidity associated with the refrigerant in the stream, wherein a dry refrigerant is one associated with the absence of humidity and a wet refrigerant is one associated with the presence of humidity. The apparatus further includes an image sensor installed proximate to the moisture sensor and adapted to capture a plurality of images of the sensor. The apparatus also includes a processor configured to control the image sensor to capture a plurality of sample images of the sensor in a set of short-predefined intervals for sensing the stream of the refrigerant; process each of the plurality of sample images to identify a plurality of colors, wherein a first color among the plurality of colors is indicative of a dry refrigerant and a second color among the plurality of colors is indicative of a wet refrigerant; calculate, for a long-predefined interval, an aggregated volume of each of the first color and the second color corresponding to the plurality of processed sample images, wherein the aggregated volumes of the first color and the second color are indicative of a volume of the dry refrigerant or the wet refrigerant respectively in the stream; compare an aggregated volume ratio of the first color and the second color with a first threshold ratio and a second threshold ratio; and determine the state as one of a dry state, a transient state, and a wet state based on the comparison.

In some embodiments, the aggregated volume ratio corresponds to a ratio of the aggregated volumes of the first color and the second color.

In some embodiments, the processor is further configured to identify a third color from the plurality of color corresponding to an abnormal image sensor operation due to lack of illumination. The processor is also configured to calculate, for a long-predefined interval, an aggregated volume of third color corresponding to the plurality of processed sample images, wherein the aggregated amount of black color is indicative of a volume of the abnormal image sensor operation due to lack of illumination. In addition, the processor compares the calculated aggregated volume of the third color with a third threshold ratio and determines an abnormality in the plurality of captured sample images based on the comparison.

In some embodiments, the state of the stream is determined as the dry state if the ratio is greater than the first threshold ratio.

In some embodiments, the state of the stream is determined as the transient state if the ratio is less than the first threshold ratio and greater than the second threshold ratio.

In some embodiments, the state of the stream is determined as the wet state if the ratio is less than the second threshold ratio.

In some embodiments, a temperature sensor is disclosed which is adapted to sense a temperature of the stream of refrigerant, wherein the processor is adapted to set a value of each of the first threshold ratio and the second threshold ratio based on the sensed temperature.

In some embodiments, a non-transitory computer-readable medium having stored thereon computer-executable instructions which, when executed by a processor of an apparatus, cause the apparatus to execute operations for identifying a state of a stream of refrigerant, the operations includes capturing, by an image sensor in a set of short-predefined intervals, a plurality of sample images of a sensor for sensing the stream of the refrigerant, wherein the sensor changes its color in response to one of presence or absence of humidity associated with the refrigerant in the stream, wherein a dry refrigerant is one associated with the absence of humidity and a wet refrigerant is one associated with the presence of humidity; processing each of the plurality of sample images to identify a plurality of colors, wherein a first color among the plurality of colors is indicative of a dry refrigerant and a second color among the plurality of colors is indicative of a wet refrigerant; calculating, for a long-predefined interval, an aggregated volume of each of the first color and the second color corresponding to the plurality of processed sample images, wherein the aggregated volumes of the first color and the second color are indicative of a volume of the dry refrigerant or the wet refrigerant respectively in the stream; comparing an aggregated volume ratio of the first color and the second color with a first threshold ratio and a second threshold ratio; and determining the state as one of a dry state, a transient state, and a wet state based on the comparison.

In some embodiments, the aggregated volume ratio corresponds to a ratio of the volume of the first color and the second color.

In some embodiments, the operation includes identifying a third color from the plurality of color corresponding to an abnormal image sensor operation due to lack of illumination. The operation also includes calculating, for the long-predefined interval, an aggregated volume of third color corresponding to the plurality of processed sample images, wherein the aggregated amount of black color is indicative of a volume of the abnormal image sensor operation due to lack of illumination. In addition, the operation includes comparing the calculated aggregated volume of the third color with a third threshold ratio and determining an abnormality in the plurality of captured sample images based on the comparison.

In some embodiments, the state is determined as the dry state if the ratio is greater than the first threshold ratio. Further, the state of the stream is determined as the transient state if the ratio is less than the first threshold ratio and greater than the second threshold ratio, and the state of the stream is determined as the wet state if the ratio is less than the second threshold ratio.

In some embodiments, the operation includes sensing, by a temperature sensor, a temperature of the refrigerant; and setting a value of each of the first threshold ratio and the second threshold ratio based on the sensed temperature.

To further clarify the advantages and features of the invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail in the accompanying drawings.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

Figure 1:
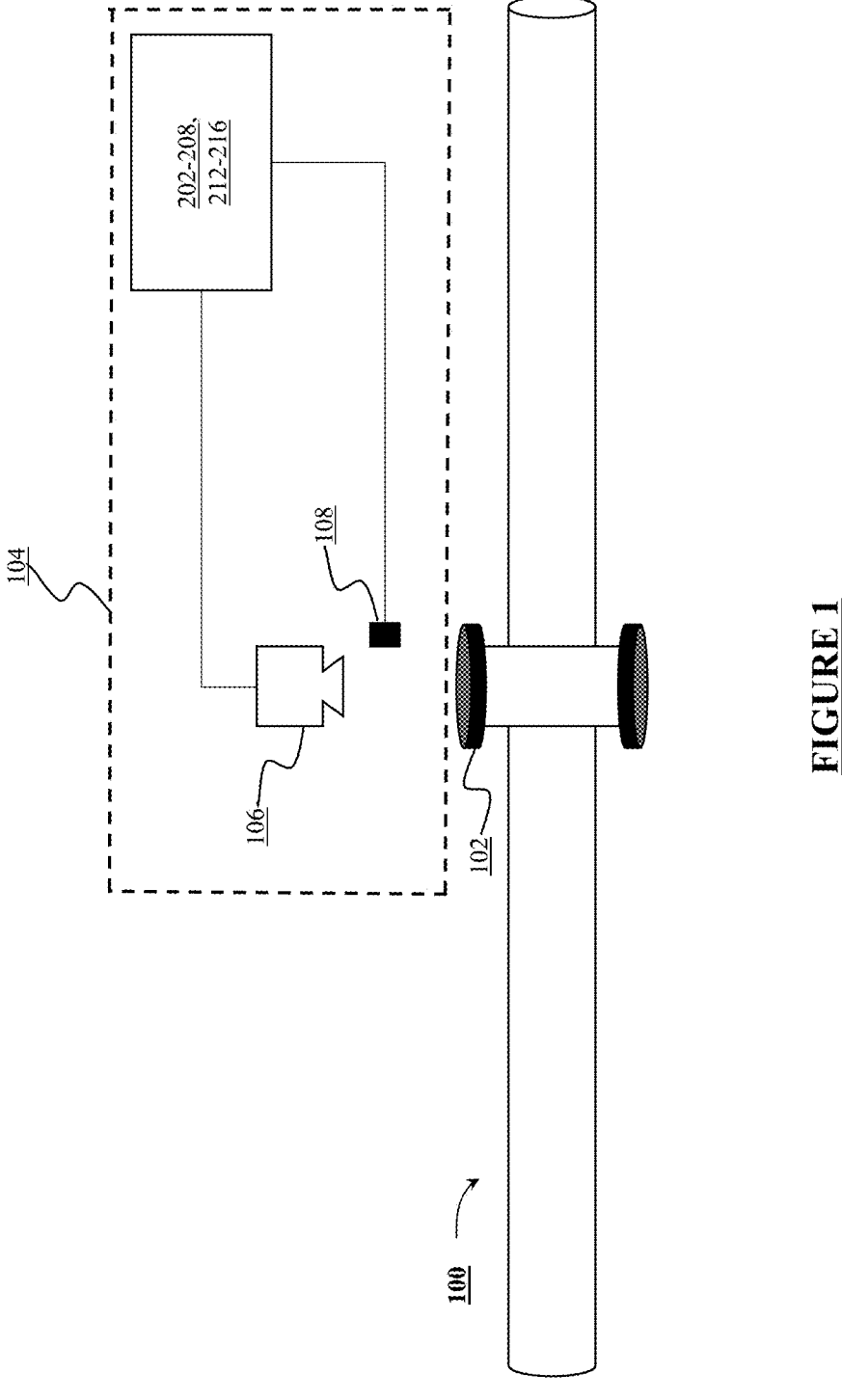
FIG. 1 illustrates a schematic view of a hose with a moisture sensor installed thereon and an apparatus for determining a state of a stream of refrigerant flowing through the hose.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the invention so as not to obscure the drawings with details that will be readily apparent to those of ordinary skill in the art having the benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which invention belongs. The system and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict or reduce the spirit and scope of the disclosure in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more elements is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements of the disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

Embodiments of the invention will be described below in detail with reference to the accompanying drawings.

FIG. 1 illustrates a schematic view of a hose 100 and an apparatus 104 having a moisture sensor 102 installed on the hose which changes a color based on a stream of refrigerant flowing through the hose 100. The hose 100 may be a part of a refrigeration system (not shown) and may be used to supply the stream of refrigerant from, in one instance, an evaporator to a compressor. The stream of refrigerant may include dry refrigerant with wet refrigerant. The dry refrigerant is understood as the refrigerant in a gaseous form whereas the wet refrigerant is understood as the presence of moisture in the stream of refrigerant. Further, during the operation of the refrigeration system, the state of the refrigerant may be dry which is tracked by the moisture sensor 102. In some cases, the state of the refrigerant changes from dry to wet and may take minutes to hours. Such a change in the state is sensed by the moisture sensor 102 and tracked by the apparatus 104. Further, determination of the state of the stream of refrigerant is performed to provide feedback to the user about the state of the refrigerant or to change the parameters of the refrigeration system or both. Such an operation is performed to detect any anomaly in the transition from the wet state to the dry state and to counter such anomalies to ensure the safety of the refrigeration system. For instance, the anomaly may be the presence of more than a measured volume of wet refrigerant in the stream.

In one example, the moisture sensor 102 changes its color in response to the presence of humidity associated with the refrigerant in the stream. In other words, the moisture sensor 102 is designed in such a way that the moisture sensor 102 exhibits different colors in response to the presence or absence of the wet refrigerant in the stream. The moisture sensor 102, for example, may exhibit blue color in the presence of dry refrigerant, and the moisture sensor 102 exhibits pink color in the presence of wet refrigerant in the stream. In one example, the moisture sensor 102 can exhibit other sets of colors, for instance, yellow or green color or any other set of colors.

The apparatus 104, on the other hand, is adapted to process the change in the color of the moisture sensor 102 to determine the state of the stream of refrigerant. The apparatus 104 may include, but is not limited to, the moisture sensor 102, an image sensor 106 and a temperature sensor 108. In addition, the apparatus 104 may include different components, labelled as 202-208, and 212-216, details of which will be provided later with respect to FIG. 2.

The image sensor 106 may be a camera that is aimed at the moisture sensor 102 and is adapted to capture images of the moisture sensor 102 with a color indicator. In one example, the moisture sensor 102 and the image sensor 106 can be a single unit, such that the moisture sensor 102 is within an enclosure of the image sensor 106 and mounted on the hose 100. The image sensor 106 is configured to capture sample images of the moisture sensor 102 at short pre-defined intervals, such that the colors of the moisture sensor 102 are captured in the sample images. In one example, the short pre-defined intervals may be 0.5 seconds or 2 seconds, such that the image sensor 106 captures 4 to 10 images in the short-predefined intervals. Capturing the images at short-predefined intervals enables the apparatus 104 to precisely determine the state of the stream of refrigerant. In one example, the image sensor 106 relays the images to the apparatus 104.

According to the disclosure, individual images taken at short-predefined intervals have less information regarding the state of the stream of refrigerant. On the other hand, the images taken at short time intervals may be processed as a set of images that belongs to a long-predefined interval. The long-predefined interval is the summation of the total time of the short-predefined intervals. Further, the long-predefined interval may also be term as an aggregation window. Further, the aggregation window may be referred to as the time period for which the sample images are captured and processed for determining the state of the stream of refrigerant.

In one example, the temperature sensor 108 is mounted near the image sensor 106 and is adapted to sense the environment temperature The sensed temperature may be used by the apparatus 104 to determine the state of the stream of refrigerant.

Figure 2:
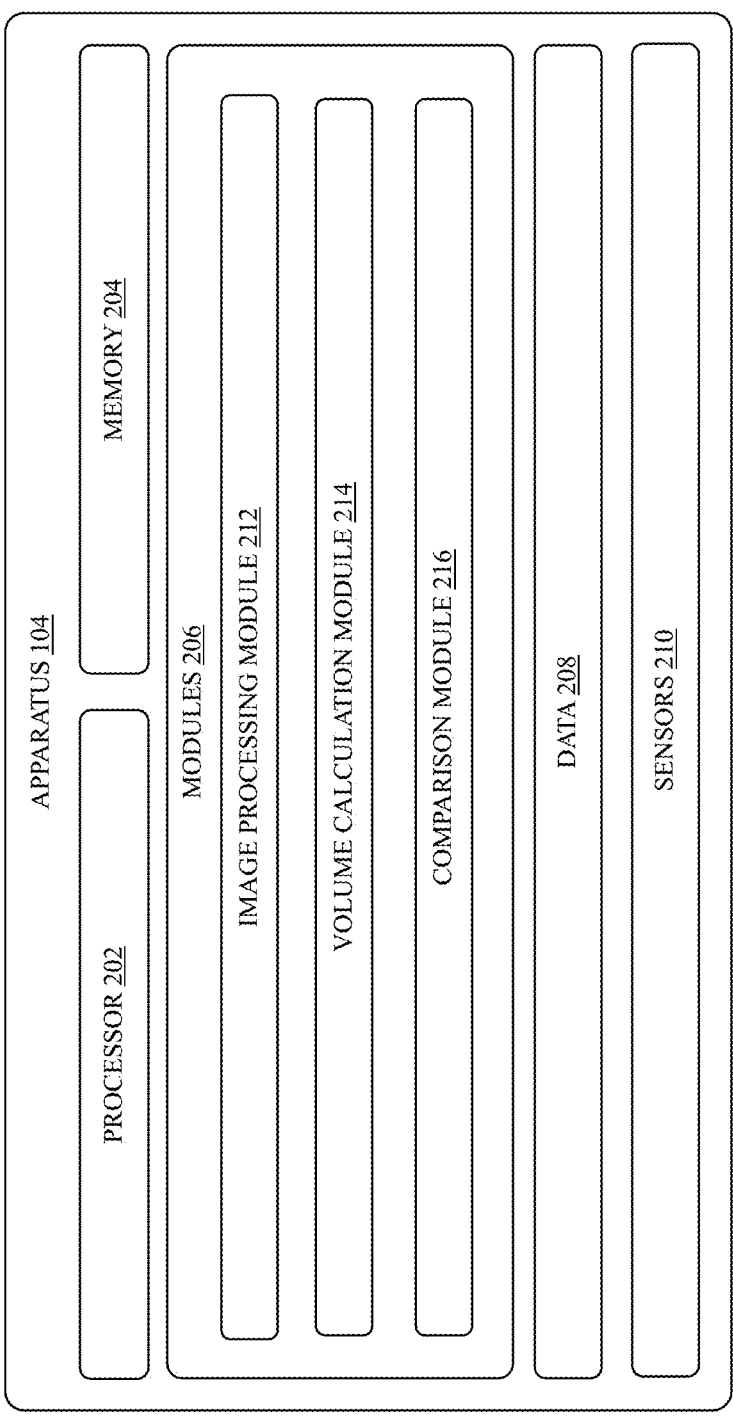
FIG. 2 illustrates a schematic view of the apparatus in FIG. 1.

FIG. 2 illustrates a detailed schematic of the apparatus 104, according to an embodiment of this disclosure. The apparatus 104 may include different components that operate synergistically to identify the state of the stream of refrigerant. For instance, the apparatus 104 may include a processor 202, a memory 204, module(s) 206, data 208, and sensors 210. The memory 204, in one example, may store the instructions to carry out the operations of the module 206. The modules 206 and the memory 204 may be coupled to the processor 202.

The processor 202 may be a single processing unit or several units, all of which could include multiple computing units. The processor 202 may be implemented as one or more microprocessors, microcomputers, microcontrollers, digital signal processor, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory 204, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The modules 206, amongst other things, include routines, programs, objects, components, data structures, etc., which perform particular tasks or implement data types. The modules 206 may also be implemented as, signal processor 202(s), state machine(s), logic circuitries, and/or any other device or component that manipulates signals based on operational instructions.

Further, the modules 206 may be implemented in hardware, instructions executed by a processing unit, or by a combination thereof. The processing unit may comprise a computer, a processor, such as the processor 202, a state machine, a logic array, or any other suitable devices capable of processing instructions. The processing unit may be a general-purpose processor 202 which executes instructions to cause the general-purpose processor 202 to perform the predefined tasks or, the processing unit may be dedicated to performing the predefined functions. In another embodiment of the disclosure, the modules 206 may be machine-readable instructions (software) that, when executed by a processor 202, perform any of the described functionalities. Further, the data serves, amongst other things, as a repository for storing data processed, received, and generated by one or more of the modules 206. The data 208 may include information and/or instruction to perform activities by the processor 202.

The module(s) 206 may perform different functionalities which may include, but may not be limited to, performing the identification test. Accordingly, the module(s) 206 may include an image processing module 212, a volume calculation module 214, and a comparison module 216.

The sensors 210 may be a suite of sensors that includes, the image sensor 106, and the temperature sensor 108 (all shown in FIG. 1).

In one example, the image processing module 212 is coupled to the image sensor 104 and is configured to process the images to identify a plurality of colors in the sample images. The image processing module 212 may apply an image processing technique to identify the colors in the sample images. The image processing module 212 performs the image processing for each sample image and relays the identified colors in each sample image to the volume calculation module 214. The image processing module 212, in one example, may identify the first color from the plurality of colors which is indicative of dry refrigerant and a second color from the plurality of colors which is indicative of the wet refrigerant. In addition, the image processing module 212 may identify a third color which may be indicative of an abnormal image sensor operation. The third color may also be indicative of a lack of illumination that hampers the capturing of a clear image of the moisture sensor 102 sensing the stream of refrigerant.

The volume calculation module 214 is coupled to the image processing module 212 and is adapted to process the identified colors. In one example, the volume calculation module 214 is adapted to calculate the volume of the first color and the color in each processed sample image. Further, the volume calculation module 214 aggregates the individual volumes of the first color and the second colors to calculate an aggregated volume of each of the first colors and the second colors. Additionally, the volume calculation module 214 may calculate an aggregated volume of the third color. The volume aggregation is performed to check for the state of the refrigerant within the long pre-defined interval. The long-predefined time interval may be 5 minutes to 10 minutes or more. As mentioned before, individual photos may be able to provide information on whether the flowing refrigerant has dry refrigerant or wet refrigerant, but not able to provide the volume of dry or wet refrigerant in the stream. Moreover, the volume identified in individual images may not be able to provide the change in the state of the stream of refrigerant. On other hand, aggregation of volume enables the determination of the volume of dry and wet refrigerants as well the transition from one state to another.

According to the disclosure, the aggregated volume of the first color is indicative of the volume of the dry refrigerant in the stream for the long-predefined interval while the aggregated volume of the second color is indicative of the volume of the wet refrigerant in the stream for the long-predefined interval. Further, the aggregated volume of the third color is an indicative abnormality in the plurality of sample images. The abnormality, in one example, may be the lack of illumination of the moisture sensor 102. The calculated aggregate volume may be processed further by the comparison module 216.

The comparison module 216 performs two tasks. First, the comparison module 216 processes the aggregated volumes against threshold values and second, the comparison module 216 may adjust the threshold values to accurately obtain the state of the stream of refrigerant. In one example, the comparison module 216 is coupled to the volume calculation module 214 and is adapted to receive the aggregated volume of the first color and the second color. In addition, the comparison module 216 is coupled to the data 208 which stores a first threshold ratio, a second threshold ratio, and a third threshold ratio. In operation, the comparison module 216 may determine an aggregated volume ratio between the aggregated volumes of the first color and the second color.

Thereafter, the comparison module 216 compares the determined aggregated volume ratio with the first threshold value and the second threshold value, and the third threshold ratio sequentially. Based on the comparison, the comparison module 216 may determine if the aggregated volume ratio is greater than or less than the first threshold ratio, the second threshold ratio, and the third threshold ratio.

In one example, in case the aggregated volume ratio is greater than the first ratio, it is indicated that a volumetric fraction of the first color is greater than a volumetric fraction of the second color. In other words, the stream of refrigerant has a greater volume of dry refrigerant than a volume of wet refrigerant. Accordingly, the state of the stream of refrigerant is categorized as a dry state.

In case the aggregated volume ratio is less than the second ratio, it is indicated that a volumetric fraction of the second color is greater than a volumetric fraction of the first color. In other words, the stream of refrigerant has a greater volume of wet refrigerant than a volume of dry refrigerant. Accordingly, the state of the stream of refrigerant is categorized as the wet state.

In case the aggregated volume ratio is less than the first ratio but greater than the second ratio, it is indicated that a volumetric fraction of the first color is comparable with a volumetric fraction of the second color. In other words, the stream of refrigerant has the almost same volume of wet refrigerant as the volume of dry refrigerant. Accordingly, the state of the stream of refrigerant is categorized as the transient state.

In case the determined ratio is greater than the third threshold ratio, it is indicated that a volumetric fraction of the third color is greater than a predefined volumetric fraction indicating an abnormality in the plurality of sample images. In other words, the captured images are not clear due to the poor illumination of the moisture sensor.

Figure 3:
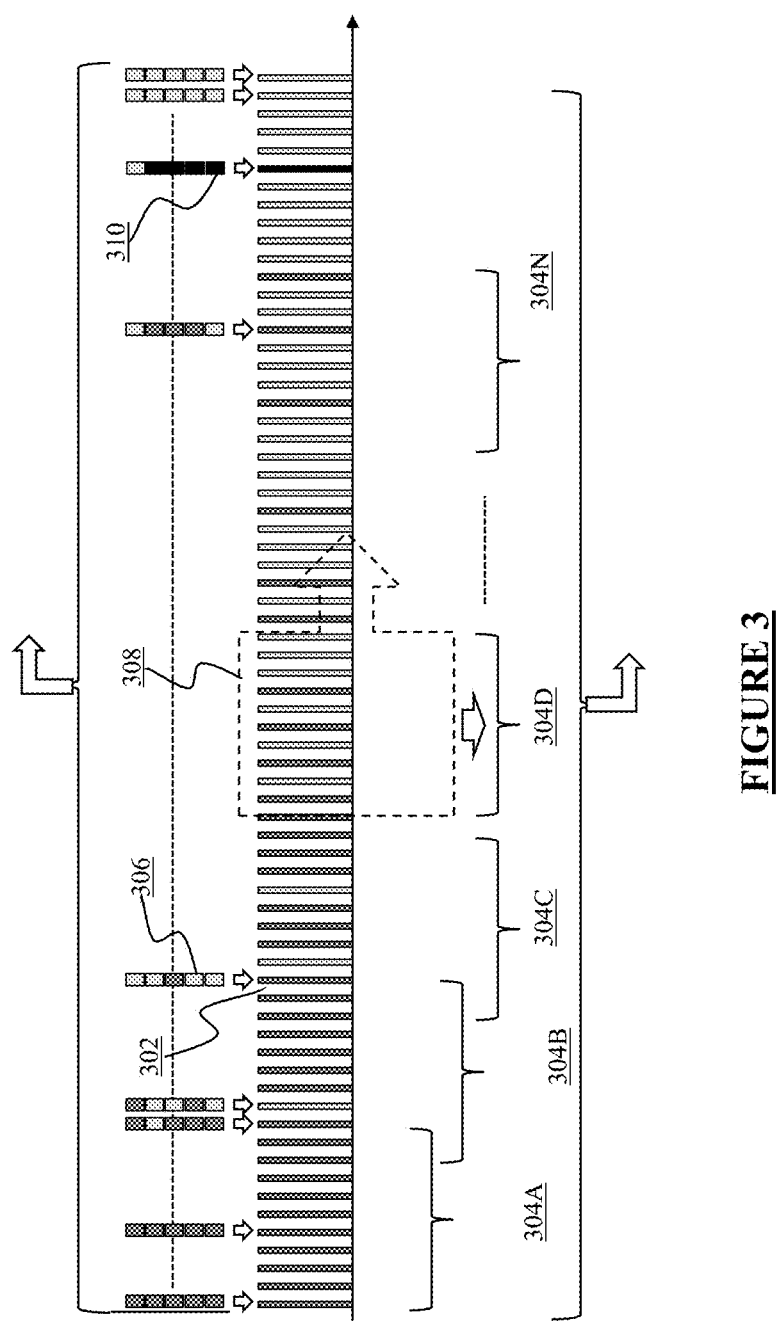
FIG. 3 illustrates a graph showing collection of sample images of the moisture sensor.
Figure 3:
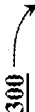

Referring now to FIG. 3 illustrates a graph 300 showing the collection of sample images 302 of the moisture sensor, according to an embodiment of the disclosure. The graph 300 is plotted against the identified color taken for a short time (seconds) versus a long time (hours) and each bar in the graph is a sample image 302 taken at short-predefined intervals. Further, as shown, each bar may have five sections and each section has a discrete color. Further, an enhanced view 306 of some bars are at the top of the bar. In the illustrated example, the short-predefined intervals are selected to capture and analyze the sample images. The set of sample images 302 is a part of long-predefined intervals 304A, 304B, 304C, 304D . . . 304N. According to the disclosure, the sample images 302 between other long-predefined intervals 304 may overlap. For instance, some of the sample images from a first long-predefined interval 304A may be the same as for a second long-predefined interval 304B. The overlaps help in reducing the amount of processing of the images for each long-predefined interval 304. In addition, processing the overlapped sample images enables separate long-predefined intervals and accurate identification of changes in the state of the stream of refrigerant.

In one example, one of the long-predefined intervals 304D may be termed the aggregation window 308. According to the disclosure, the size and number of aggregation windows may vary based on various factors, such as the set of short-predefined intervals, and detection of abnormality, among other examples. The graph 300 also shows an abnormal sample image 310 which indicates that the lack of illumination which renders the image sensor 106 ineffective in correctly capturing the sample image of the moisture sensor 102.

Figure 4:
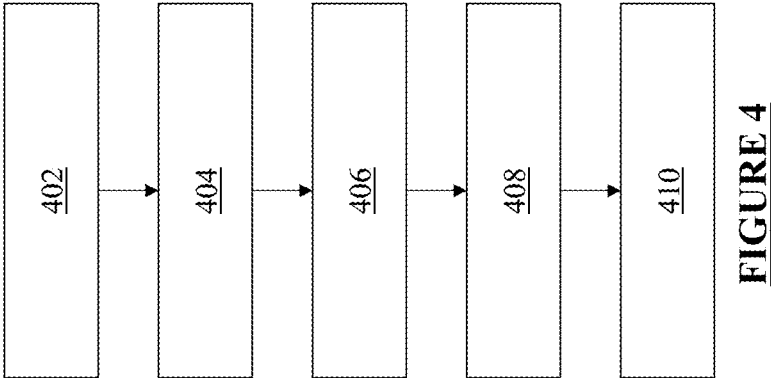
FIG. 4 illustrates a method for identifying the state of the stream of refrigerant.
Figure 4:

A manner in which the graph 300 is generated and inference is plotted is explained with respect to FIG. 4, according to an embodiment of the disclosure. Specifically, FIG. 4 illustrates a method 400 for identifying the state of the stream of refrigerant. The order in which the method steps are described below is not intended to be construed as a limitation, and any number of the described method steps may be combined in any appropriate order to execute the method or an alternative method. Additionally, individual steps may be deleted from the method without departing from the spirit and scope of the subject matter described herein.

The method 400 may be performed by programmed computing devices, for example, based on instructions retrieved from non-transitory computer readable media. The computer readable media may include machine-executable or computer-executable instructions to perform all or portions of the described method. The computer readable media may be, for example, digital memories, magnetic storage media, such as magnetic disks and magnetic tapes, hard drives, or optically readable data storage media.

In one example, the method 400 may be performed partially or completely by the apparatus 104 shown in FIGS. 1 and 2. The method begins at step 402 at which the processor 202 actuates the image sensor 106 to start capturing the sample images of the moisture sensor 102 which changes its color in response to one presence or absence of humidity associated with the refrigerant in the stream sensing the stream of refrigerant. The image sensor 106, in response, captures a plurality of images for short-predefined intervals and relays the images back to the image processing module 212.

Once captured, the method 400, at step 404, the processor 202 actuates the image processing module 212 to process each sample image and identify the first color and the second color. The image processing module 212 processes the sample images in a manner explained above to identify the first color and the second color. The information of the identified first color and the second color are relayed to the volume calculation module 214.

Further, at step 406, the processor 202 actuates the volume calculation module 214 to calculate the aggregated volume of each of the first color and the second color corresponding to the plurality of processed sample images. The volume calculation module 214 may perform the summation of the volume of each segment in each sample image to determine the aggregated volumes for each of the first color and the second color.

At step 408, the processor 202 actuates the comparison module 216 to determine the aggregated volume ratio of the aggregated volumes of the first color and the second color with the first threshold ratio and the second threshold ratio.

Finally, at step 410, the processor 202 determines the state as one a dry state, a transient state, and a wet state based on the comparison. The state is determined as the dry state if the ratio is greater than the first threshold value. On the other hand, the state of the stream is determined as the transient state if the ratio is less than the first threshold ratio and greater than the second threshold ratio. Further, the state of the stream is determined as the wet state if the ratio is less than the second threshold ratio. The determined state may be relayed by the processor 202 via a feedback unit (not shown) or either a user or a central controller. The controller may then act on the determined state.

In some embodiments, as part of step 404, the image processing module 212 may also identify the third color in the sample images. Further, as a part of step 406, the volume calculation module 214 determines the aggregated volume of the third color. Furthermore, as part of step 408, the comparison module 216 may compare the determined aggregated volume of the third color with the third threshold ratio. In case the aggregated volume of the third color is greater than the third threshold ratio, the comparison module 216 determines that there is an abnormality in the plurality of sample images and the processor 202 relays the same feedback via the feedback unit.

In one example, the comparison module 216 may also receive the signal from the temperature sensor 108 corresponding to the sensed temperature of the stream. Based on the sensed temperature, the comparison module 216 may set the value of each of the first threshold ratio and the second threshold ratio. For example, in case the sensed temperature is high, the comparison module 216 determines that there are fewer chances of the presence of wet refrigerant in the stream. Accordingly, the comparison module 216 may set the first threshold ratio and the second threshold ratio to a low value to prevent erroneous determination of the state. On the other hand, the comparison module 216 may set the first threshold ratio and the second threshold ratio to a high value in case the sensed temperature is low indicating that there are more chances of the presence of wet refrigerant in the stream.

This disclosure also relates to a non-transitory computer-readable medium having stored thereon computer-executable instructions which, when executed by a processor 202 of the apparatus 104, cause the apparatus to execute operations for identifying a state of a stream of refrigerant. In the illustrated example, the instructions, when executed cause the processor 202 to execute the aforementioned operations.

The operations comprise, but are not limited to, capturing, by an image sensor in a set of short-predefined intervals, a plurality of sample images of a sensor for sensing the stream of the refrigerant, wherein the sensor changes its color in response to one of presence or absence of humidity associated with the refrigerant in the stream;

The operation further includes processing each of the plurality of sample images to identify a plurality of colors, such that a first color among the plurality of colors is indicative of a dry refrigerant and a second color among the plurality of colors is indicative of a wet refrigerant. The operation further includes calculating, for a long-predefined interval, an aggregated volume of each of the first color and the second color corresponding to the plurality of processed sample images. In one example, the aggregated volumes of the first color and the second color are indicative of a volume of the dry refrigerant and the wet refrigerant respectively in the stream. Further, the operation includes comparing an aggregated volume ratio of the first color and the second color with a first threshold ratio and a second threshold ratio, and determining the state as one of a dry state, a transient state, and a wet state based on the comparison.

According to this disclosure, capturing the sample images for short-predefined intervals that have a low probability of determining the state of stream processing them enables a high probability of determining the state of the stream. Moreover, the sample images in each long-predefined interval are common which enables a better assessing the state of the stream.

While specific language has been used to describe the disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for identifying a state of a stream of refrigerant, comprising:

capturing, by an image sensor in a set of short-predefined intervals, a plurality of sample images of a sensor for sensing the stream of the refrigerant, wherein the sensor changes its color in response to one of presence or absence of humidity associated with the refrigerant in the stream, wherein a dry refrigerant is one associated with the absence of humidity and a wet refrigerant is one associated with the presence of humidity;

processing each of the plurality of sample images to identify a plurality of colors, wherein a first color among the plurality of colors is indicative of the dry refrigerant and a second color among the plurality of colors is indicative of the wet refrigerant;

calculating, for a long-predefined interval, an aggregated volume of each of the first color and the second color corresponding to the plurality of processed sample images, wherein the aggregated volumes of the first color and the second color are indicative of a volume of the dry refrigerant and the wet refrigerant respectively in the stream;

comparing an aggregated volume ratio of the first color and the second color with a first threshold ratio and a second threshold ratio; and determining the state as one of a dry state, a transient state, and a wet state based on the comparison.

2. The method of claim 1, wherein the aggregated volume ratio corresponds to a ratio of the aggregated volumes of the first color and the second color.

3. The method of claim 1, comprising:

identifying a third color from the plurality of colors corresponding to an abnormal image sensor operation due to lack of illumination;

calculating, for the long-predefined interval, an aggregated volume of third color corresponding to the plurality of processed sample images, wherein the aggregated amount of the third color is indicative of a volume of the third color;

comparing the calculated aggregated volume of the third color with a third threshold ratio;

determining an abnormality in the plurality of captured sample images based on the comparison.

4. The method of claim 1, wherein the state of the stream is determined as the dry state if the ratio is greater than the first threshold ratio.

5. The method of claim 1, wherein the state of the stream is determined as the transient state if the ratio is less than the first threshold ratio and greater than the second threshold ratio.

6. The method of claim 1, wherein the state of the stream is determined as the wet state if the ratio is less than the second threshold ratio.

7. The method of claim 1, comprising:

sensing, by a temperature sensor, a temperature of the refrigerant; and setting a value of each of the first threshold ratio and the second threshold ratio based on the sensed temperature.

8. An apparatus for sensing a state of a stream of refrigerant, comprising:

a moisture sensor in fluid communication with the stream of refrigerant and adapted to changes color in response to one of presence or absence of humidity associated with the refrigerant in the stream, wherein a dry refrigerant is one associated with the absence of humidity and a wet refrigerant is one associated with the presence of humidity;

an image sensor installed proximate to the moisture sensor and adapted to capture a plurality of images of the sensor; and a processor configured to:

control the image sensor to capture a plurality of sample images of the sensor in a set of short-predefined intervals for sensing the stream of the refrigerant;

process each of the plurality of sample images to identify a plurality of colors, wherein a first color among the plurality of colors is indicative of the dry refrigerant and a second color among the plurality of colors is indicative of the wet refrigerant;

calculate, for a long-predefined interval, an aggregated volume of each of the first color and the second color corresponding to the plurality of processed sample images, wherein the aggregated volumes of the first color and the second color are indicative of a volume of the dry refrigerant and the wet refrigerant respectively in the stream;

compare an aggregated volume ratio of the first color and the second color with a first threshold ratio and a second threshold ratio; and determine the state as one of a dry state, a transient state, and a wet state based on the comparison.

9. The apparatus of claim 8, wherein the aggregated volume ratio corresponds to a ratio of the aggregated volumes of the first color and the second color.

10. The apparatus of claim 8, wherein the processor is further configured to:

identify a third color from the plurality of color corresponding to an abnormal image sensor operation due to lack of illumination;

calculate, for the long-predefined interval, an aggregated volume of third color corresponding to the plurality of processed sample images, wherein the aggregated amount of black color is indicative of a volume of the abnormal image sensor operation due to lack of illumination;

compare the calculated aggregated volume of the third color with a third threshold ratio;

determine an abnormality in the plurality of captured sample images based on the comparison.

11. The apparatus of claim 8, wherein the state of the stream is determined as the dry state if the ratio is greater than the first threshold ratio.

12. The apparatus of claim 8, wherein the state of the stream is determined as the transient state if the ratio is less than the first threshold ratio and greater than the second threshold ratio.

13. The apparatus of claim 8, wherein the state of the stream is determined as the wet state if the ratio is less than the second threshold ratio.

14. The apparatus of claim 8, comprising a temperature sensor adapted to sense a temperature of the stream of refrigerant, wherein the processor is adapted to set a value of each of the first threshold ratio and the second threshold ratio based on the sensed temperature.

15. A non-transitory computer-readable medium having stored thereon computer-executable instructions which, when executed by a processor of an apparatus, cause the apparatus to execute operations for identifying a state of a stream of refrigerant, the operations comprising:

capturing, by an image sensor in a set of short-predefined intervals, a plurality of sample images of a sensor for sensing the stream of the refrigerant, wherein the sensor changes its color in response to one of presence or absence of humidity associated with the refrigerant in the stream, wherein a dry refrigerant is one associated with the absence of humidity and a wet refrigerant is one associated with the presence of humidity;

processing each of the plurality of sample images to identify a plurality of colors, wherein a first color among the plurality of colors is indicative of the dry refrigerant and a second color among the plurality of colors is indicative of the wet refrigerant;

calculating, for a long-predefined interval, an aggregated volume of each of the first color and the second color corresponding to the plurality of processed sample images, wherein the aggregated volumes of the first color and the second color are indicative of a volume of the dry refrigerant and the wet refrigerant respectively in the stream;

comparing an aggregated volume ratio of the first color and the second color with a first threshold ratio and a second threshold ratio; and determining the state as one of a dry state, a transient state, and a wet state based on the comparison.

16. The non-transitory computer-readable medium of claim 15, wherein the aggregated volume ratio corresponds to a ratio of the volume of the first color and the second color.

17. The non-transitory computer-readable medium of claim 15, wherein the operation comprises:

identifying a third color from the plurality of color corresponding to an abnormal image sensor operation due to lack of illumination;

calculating, for the long-predefined interval, an aggregated volume of third color corresponding to the plurality of processed sample images, wherein the aggregated amount of black color is indicative of a volume of the abnormal image sensor operation due to lack of illumination;

comparing the calculated aggregated volume of the third color with a third threshold ratio;

determining an abnormality in the plurality of captured sample images based on the comparison.

18. The non-transitory computer-readable medium of claim 15, wherein the state is determined as the dry state if the ratio is greater than the first threshold ratio;

the state of the stream is determined as the transient state if the ratio is less than the first threshold ratio and greater than the second threshold ratio; and the state of the stream is determined as the wet state if the ratio is less than the second threshold ratio.

19. The non-transitory computer-readable medium of claim 15, wherein the operation comprises:

sensing, by a temperature sensor, a temperature of the refrigerant; and setting a value of each of the first threshold ratio and the second threshold ratio based on the sensed temperature.

\* \* \* \* \*